3,216,935
LUBRICANT
Arnold J. Morway, Clark, and William J. Sparks, Westfield, N.J., assignors to Esso Research and Engineering Company, a corporation of Delaware
No Drawing. Filed Aug. 22, 1962, Ser. No. 218,541
7 Claims. (Cl. 252—32.5)

This invention relates to lubricants comprising oil containing polypropylene and a petroleum resin. Particularly, the invention relates to grease compositions comprising oil containing high molecular weight crystalline polypropylene as a grease thickener, and petroleum resin to stabilize the polypropylene against separation from the oil.

Recently, solid greases have been formed by dispersing high molecular weight crystalline polypropylene in mineral oil. In these polypropylene greases, a very small amount, for example 3 to 5 wt. percent of the polypropylene is sufficient to thicken mineral oil to a solid grease composition, as compared to the more conventional soap thickened greases where 12 to 20 wt. percent of soap is usually required to obtain the same degree of thickening. While the polypropylene is more expensive per se than conventional soaps, this is usually more than offset by the smaller amount of polypropylene required. It has now been found that the use of petroleum resin improves polypropylene grease and also permits easier manufacturing of polypropylene-containing grease. In general, greases containing a mixture of petroleum resin and polypropylene will be more structurally stable, will have a better appearance, will be easier to homogenize and will have a longer lubrication life than corresponding greases prepared with polypropylene but with no petroleum resin present. The petroleum resin appears to have a plasticizing effect on the polypropylene so as to inhibit aggregation of polypropylene into hard curdy masses which tend to separate from the oil base. Also, the transition, or crystallization, temperature of a polypropylene-petroleum resin grease is higher than a polypropylene grease. This, in turn, can considerably reduce the cooling time required in large-scale grease manufacture. Thus, in making a polypropylene grease, and also in making a polypropylene-petroleum resin grease, cooling (without stirring) to a temperature below the transition point of the grease appears to be the most practical manner of making these resin greases when no other modifiers are present. After the grease has cooled down below its transition point, then a more rapid cooling can be obtained by merely stirring the grease batch as it air cools. For example, the difference in transition temperatures between a polypropylene-petroleum resin grease having a transition point of about 150° F. and a polypropylene grease having a transition point of about 100° F. can mean as much as 5 or more hours difference in cooling time when making a 10,000 pound batch of grease.

Good, low dropping point greases can be prepared by thickening oil with the petroleum resin and polypropylene. However, these greases can be further improved in several of their properties by the addition of other materials. Thus, by the addition of an alkaline earth metal salt of a $C_1$ to $C_4$ fatty acid, e.g., calcium acetate, in a very fine particle size, to the polypropylene-petroleum resin grease, the dropping point of the grease can be raised over 100° F. to about 350° F. In addition, these $C_1$ to $C_4$ fatty acid salts improve the antiwear and load-carrying ability of the resulting grease.

In brief, the present invention encompasses the improvement of a polypropylene-thickened grease by incorporating petroleum resin. Optionally, finely divided metal salt, preferably calcium acetate, is added to raise the dropping point and to improve the load-carrying ability of the grease. The result is inexpensive lubricating grease compositions having fairly good dropping points and good structure stability and which can have good load-carrying and antiwear properties.

The polypropylene employed in this invention is high molecular weight crystalline polypropylene resin. This polypropylene resin can be prepared by polymerizing propylene in the presence of a catalyst obtained by mixing a compound having reducing properties with a reducible compound of a heavy metal. Such polypropylene has been found to have unique structures and properties. The polypropylene molecules are almost completely linear and have practically no branched chains and have only a small amount of unsaturation. Oil-dispersible polypropylene of about 20,00 to 1,000,000, preferably 50,000 to 700,000 molecular weight, can be used in the present invention. The molecular weights referred to in this specification are obtained by determining the intrinsic viscosity and referring to the Harris correlation graph (J. Pol. Sci., 8, 361 (1952)). A specific crystalline polypropylene used in the working examples of the invention had a molecular weight of about 600,000 and is marketed under the trade name of Escon by the Enjay Chemical Co.

Hydrocarbon or petroleum resins applicable in the present invention are generally made by treating a hydrocarbon mixture containing diolefins, olefins, aromatics, paraffins, and naphthenes with 0.25 to 1.75% of an aluminum halide catalyst, such as aluminum chloride or aluminum bromide. The catalysts may be used as solids, or they may be employed as slurries in inert diluents, or as hydrocarbon complexes such as are prepared by reacting aluminum chloride with raffinates stripped from resin polymerizates, for example, a naphtha containing about 60% olefins and 40% aromatics.

The polymerization feed for the petroleum resin should preferably be one from which the cyclodienes have been substantially removed. Hydrocarbon fractions useful for feeds in making these resins generally boil from 20° to 170° C. Such feeds are conveniently found in hydrocarbon streams obtained by steam cracking gas oils, heavy naphthas, or residua from petroleum. A typical feed, commercially used, shows the following composition:

|  | Fraction, ° C. | Wt. Percent |
|---|---|---|
| Distillation | 20–70 | 0–60 |
|  | 70–130 | 65–40 |
|  | 130–170 | 35–0 |
| Diolefins |  | 8–20 |
| Aromatics |  | 19–49 |
| Olefins |  | 60–30 |
| Paraffins and Naphthenes |  | 5–1 |

The polymerization reaction to form the petroleum resin is generally conducted at temperatures in the range of −30° to +75° C. (preferably −10° to +60° C.) After polymerization, residual catalyst is quenched by suitable methods, such as addition of methyl alcohol and subsequent filtration, or by addition of dilute acid, water and/or caustic washing. The final solution is then stripped of unreacted hydrocarbons and low molecular weight oils by vacuum or steam distillation. The product is a substantially nonaromatic unsaturated hydrocarbon resin.

A preferred petroleum resin prepared in accordance with the processes discussed above will have a softening point of about 207° to 218° F., a molecular weight in the range of 900 to 1,200, and an iodine number (Wijs) of 100 to 140. A specific petroleum resin of this type, which was used in the working examples of the invention, was obtained under the trade name "Piccopale 100" resin from Pennsylvania Industrial Chemical Corporation. Typical inspections of this resin are as follows:

| Name | "Piccopale 100" resin |
|---|---|
| Softening point, ball and ring (ASTM E–28–5–T) | 100 ±3° C. |
| Molecular weight, approximate | 1,100. |
| Specific gravity, approximate | .970–.975. |
| Refractive index | 1.5116 |
| Acid No. | <1. |
| Saponification No. | <2. |
| Bromine No. | 7.3 |
| Iodine value | (Wijs) 120. |
| Flash point | 500° F. |
| Fire point | 500° F. |

As previously indicated, various alkaline earth metal salts of low molecular weight fatty acids can be optionally included in the petroleum resin-polypropylene grease, such as barium acetate, calcium acetate, calcium formate, calcium propionate, etc. Calcium acetate is preferred since it is economical and in general is the most effective of these salts in imparting antiwear properties and load-carrying ability to a grease. Furthermore, the calcium acetate also modifies the grease so that the grease can be cooled down with constant stirring, thus even further decreasing the manufacturing time. The salt can be incorporated in the grease in a number of different ways. However, it should preferably be present in the very finely-divided form, e.g., 15 microns or less, in order to secure good stability and avoid grittiness of the grease. One method of obtaining such finely-divided salt in the grease of the invention is to form it in situ by neutralization in the oil by adding alkaline earth metal base, e.g., lime, and the $C_1$ to $C_4$ fatty acid, e.g., acetic acid or its anhydride, to the oil. After this neutralization the polypropylene and petroleum resin can be dispersed in the oil. Preformed salts, mechanically milled to very fine particle size, can be simply dispersed in the polypropylene-petroleum resin grease. Or preformed salt can be prepared in situ in a carrier by neutralization, then the salt can be precipitated from said carrier in the presence of a protective material which will coat the small particles of salt as they precipitate. Still another method involves crystallizing salt from an aqueous solution in the presence of oil containing a protective material. Finely divided calcium acetate prepared by this last-mentioned method, using an imidazoline salt as the protective material, was used in the examples of the invention. Specifically, in this method, the fatty acid salt is dissolved in water, preferably to form a saturated solution. This solution is then added to a small amount of mineral oil in which is dispersed a surface active agent of the amino imidazoline salt type. The resulting mixture is heated to drive off most of the water. The mass is then cooled to form a grease-like solid mass containing finely-divided particles of dry fatty acid salt coated with the amino imidazoline salt. This grease-like mass can then be used in preparing the grease of the invention.

The amino imidazolines useful to form the salt surfactant in the just described process, include those having the general structure:

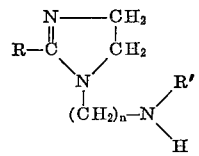

In the above formula, $n$ is about 2 to 6, preferably 2 to 3; R is a $C_6$ to $C_{22}$, preferably a $C_{16}$ to $C_{18}$, hydrocarbon group, either saturated or unsaturated, and preferably aliphatic; while R' is either hydrogen or a $C_1$ to $C_{18}$ alkyl group. Preferably, the number of carbon atoms in R is small, R' is hydrogen and $n$ is a small integer, e.g., 2, in order that the effectiveness of the imidazoline is as great as possible per pound of material. In other words, the effectiveness of the imidazoline in the present invention apparently depends on the ring structure and the terminal amino group, while the number of carbon atoms in the branches merely dilutes the effectiveness of the material per pound of imidazoline.

A specific example of imidazoline of the above formula, which was used in the working examples of the invention, is a commercial 1-(2 amino ethyl-2-n-alkenyl-2-imidazoline) having the formula:

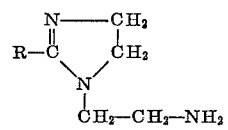

wherein R represent heptadecenyl and heptadecadienyl chains in a mol ratio of about 1:1, respectively. This produce is available under the name Nalcamine G–39M from Nalco Chemical Co. of Chicago, Illinois.

The acid reacted with the imidazoline to form the salt surfactant, includes inorganic mineral acids, such as ortho, pyro and meta phosphoric acids, hydrochloric acid, sulfuric acid, nitric acid, and also phytic acid which is closely related to phosphoric acid and probably froms phosphoric acid salt in the present process.

Phytic acid is the hexaphosphoric acid ester of inositol. It is a strong acid containing twelve acidic hydrogen groups. Its structural formula is believed to be as follows:

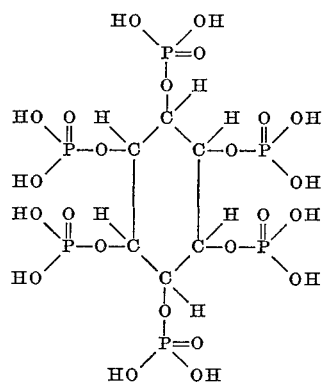

This material, having a molecular weight of 666 with 12 reactive hydrogen groups, has a combining weight (mol equivalent weight) of 55.

Phytic acid is derived from grain, and is a by-product from waste corn steep liquor. A description of phytic acid and its preparation is given in Chemical Engineering, January 27, 1958, under the title "Ion Exchange Now Yields Phytic Acid," published by McGraw-Hill Publishing Co., Inc., New York, New York.

The amino imidazoline salt is prepared by mixing the imidazoline and appropriate acid, preferably in a small amount of inert hydrocarbon oil, to form the imidazoline salt. Stoichiometric amounts of the imidazoline and acid, sufficient to form a neutral salt can be used. Then, as previously indicated, an aqueous solution, preferably saturated, of the salt to be finely divided, e.g., calcium acetate, is stirred into the mixture of oil and the imidazoline salt. Water is removed by heating or distillation to form a grease-like mass, which can be conveniently added to the resin-containing grease.

The compositions of the invention can be normally solid, semi-fluid or fluid and will generally comprise a major amount of lubricating oil, about 0.5 to 5 wt. percent of polypropylene, about 0.5 to 5 wt. percent of petroleum resin, and about 0 to 15 wt. percent of alkaline earth metal salt. Preferred compositions will comprise a major amount of mineral lubricating oil, about 1.0 to 3.0 wt. percent polypropylene, about 1.0 to 3.0 wt. percent petroleum resin and about 7 to 12 wt. percent calcium acetate, along with a stabilizing amount of a stabilizer for the calcium acetate which will usually be about 5 to 30 wt. percent of stabilizer based upon the weight of the calcium acetate.

The lubricants of the invention are preferably prepared by simply dispersing polypropylene and the petroleum resin in lubricating oil by heating to a temperature above the melting point of the polymers, for example heating to 250° to 400° F., and stirring, until the polymers are completely dispersed in the oil. A fatty acid salt dispersion can be added at any time. For example, the hot oil dispersion of the polymers can be cooled to form a solid grease structure to which a dispersion of fatty acid salt, preferably suitably stabilized, is added to the composition, following which the composition can again be heated to evaporate any remaining water, then again cooling the composition, and finally adding any additives and/or homogenizing.

The lubricating oil can be either a mineral oil or a synthetic oil, such as diesters (e.g. di-2-ethylhexyl sebacate), polysilicones, Ucons, etc.

Various other additives may also be added to the lubricating composition in amounts of about 0.1 to 10.0 wt. percent, based on the total weight of the composition. Examples of such additives include oxidation inhibitors, such as phenyl alpha naphthylamine; corrosion inhibitors, such as sodium nitrate, sorbitan monooleate; dyes; other grease thickeners; e.p. agents; etc.

The invention will be further understood by reference to the following examples:

EXAMPLE I

Grease A 4.0 wt. percent of crystalline polypropylene resin of about 600,000 molecular weight (Escon) in a powdered form was dispersed in 96.0 wt. percent mineral lubricating oil having a viscosity at 210° F. of 55 SUS. Heating was initiated and while heating and stirring, the resin was dissolved in the oil at 320° F. The dispersion was then cooled without further agitation, and a solid, structurally-stable grease formed at the transition temperature of about 100° F.

Grease B 4.0 wt. percent of Piccopale 100 resin (previously described) was dissolved in 96.0 wt. percent mineral lubricating oil by mixing while heating to 300° F. On cooling to room temperature, no solid grease structure formed.

Grease C

A mixture of 2.0 wt. percent of the Escon polypropylene, 2 wt. percent Piccopale 100 resin and 96.0 wt. percent mineral lubricating oil was heated to 320° F. while stirring, until the two polymers had melted and were completely dissolved in the oil. Then the solution (or dispersion) was allowed to cool without stirring to slightly below the transition point of the polypropylene (150° F.), and was then further cooled rapidly while stirring.

The composition of Greases A to C and their physical appearance and consistency are summarized in Table I, which follows:

TABLE I

|  | Greases | | |
| --- | --- | --- | --- |
|  | A | B | C |
| Composition (Wt. %): | | | |
| Polypropylene Resin 600 M Molecular Weight | 4.0 |  | 2.0 |
| Piccopale 100 Resin |  | 4.0 | 2.0 |
| Mineral Lubricating Oil 55 SUS at 210° F. | 96.0 | 96.0 | 96.0 |
| Properties: | | | |
| Appearance | (¹) | Fluid | (²) |
| ASTM Penetration at 77° F., mm./10: | | | |
| Unworked | 250 | Fluid | 320 |
| Worked 60 Strokes | 265 | Fluid | 325 |

¹ Slightly rough.
² Smooth homogeneous.

As seen by the preceding table, the petroleum resin per se (i.e., the Piccopale 100 resin) did not form a solid grease structure, and only slightly increased the viscosity of the oil. The polypropylene grease (Grease A) had a slightly rough appearance, i.e., the grease was not clearly homogeneous and was approaching graininess, while the polypropylene-petroleum resin grease (Grease C) had a smooth, homogeneous appearance. Homogenization of Grease A will still result in a slightly rough grease although it will, of course, be somewhat smoother than if no homogenization were used at all. Grease C was more stable to mechanical working as indicated by an increase of 5 mm./10 when worked 60 strokes as compared to Grease A which had an increase of 15 mm./10 when worked an equal amount.

The difference in appearance noted above has a practical effect in that Grease A will tend to be harder to disperse and be more susceptible to plugging than Grease C when the greases are used in high pressure lubrication systems having capillary or very small diameter feed lines, such as Trabon lubricators.

EXAMPLE II (All parts by weight)

A calcium acetate dispersion was prepared as follows:
18.8 parts of a mineral lubricating oil of 55 SUS viscosity at 210° F. and 10 parts of Nalcamine G–39M were added to a steam-heated grease kettle and while mixing, 2.2 parts of phytic acid were added in the form of a 50 wt. percent aqueous dispersion of phytic acid in water. A gel formed upon the addition of the phytic acid. Then 70 parts of calcium acetate were added in the form of a smooth, paste-like aqueous dispersion consisting of 50 wt. percent calcium acetate in 50 wt. percent water. The entire composition was heated to a temperature of 250° F. to evaporate nearly all water, after which a stable, solid, oatmeal-like gel formed and heating was discontinued. This gel was stable and showed no tendency to separate in storage.

The Nalcamine G–39M is 1-(2 amino-ethyl-2-n-alkenyl-2-imidazoline).

1.73 parts of crystalline polypropylene resin (Escon) and 1.73 parts of Piccopale 100 resin were mixed with 66.67 parts of a mineral lubricating oil having a viscosity of 55 SUS at 210° F. and a V.I. of 45, and 17.37 parts of a second mineral oil having a viscosity of 60 SUS at 210° F. and a V.I. of 60. The mixture was heated to 320° F., while stirring, until the polymers had melted and were completely dissolved in the oil. The fluid product was then allowed to cool below the transition point of the polypropylene resin, i.e., the product was cooled to about 100° F. without any agitation, to thereby form a solid grease structure. To this grease structure was added 11.67 parts of calcium acetate dispersion prepared as described above. Next, the total composition was heated, while mixing, to a temperature of 400° F., which temperature was maintained for about 0.5 hour while the composition was dehydrated. Following this, the composition was cooled to 250° F. where 0.83 part of phenyl-alpha-naphthylamine was mixed into the composition as an oxidation inhibitor. The composition was cooled to 100° F., with stirring, and then homogenized by passage through a Gaulin homogenizer operating at 1500 p.s.i. After homogenization, the grease was allowed to cool to room temperature.

The formulation of the lubricating grease of Example II and its physical properties are summarized in the following Table II.

TABLE II

Formulation, parts by weight

| | |
|---|---|
| Polypropylene (Escon) | 1.73. |
| Piccopale 100 | 1.73. |
| Calcium acetate dispersion [1] | 11.67. |
| Phenyl alpha-naphthylamine | 0.83. |
| Mineral lubricating oil, 60 SUS at 210° F. | 17.37. |
| Mineral lubricating oil, 55 SUS at 210° F. | 66.67. |

Properties

| | |
|---|---|
| Appearance | Smooth, homogeneous and slightly fibrous. |
| Dropping point, °F. | 375. |
| ASTM penetration—77° F. mm./10: | |
| Unworked | 283. |
| Worked 60 strokes | 315. |
| Worked 10,000 strokes with fine hole worker plate | 330. |
| Wheel bearing test | Pass. |
| No slump | No leakage. |
| High temperature spindle test [2] (204 ball bearing) 10,000 r.p.m.—250° F.—hours | 1,200. |
| Load carrying or extreme pressure tests: | |
| Timken test, load carried | 45+ lbs. |
| Almen test, weights carried | 15. |
| 4-ball wear test, scar diameter mm. (1,800 r.p.m.—10 kg. load—75° C. 1 hour) | 0.30. |

[1] 10.0% Nalcamine G-39M, 2.2% phytic acid, 70.0% calcium acetate, 18.8% mineral lubricating oil of 55 SUS at 210° F.
[2] ABEC-NLGI spindle test.

As seen by the properties of Table II, the grease of Example II represented a low-cost, medium dropping point grease, having a good appearance, good load carrying and e.p. properties, good antiwear properties, etc.

What is claimed is:

1. A lubricating composition comprising a major amount of lubricating oil, about 0.5 to 5.0 wt. percent of a substantially linear polypropylene of about 20,000 to 1,000,000 molecular weight and about 0.5 to 5.0 wt. percent of a substantially nonaromatic, unsaturated, hydrocarbon resin that has been prepared by catalytic polymerization of a steam-cracked petroleum hydrocarbon fraction, boiling in the range of from 20° to 170° C. and having a composition of 8 to 20 wt. percent diolefins, 19 to 49 wt. percent aromatics, 30 to 60 wt. percent olefins, and 1 to 5 wt. percent paraffins and naphthenes.

2. A lubricant according to claim 1, which also contains from about 0 to 15 wt. percent of an alkaline earth metal salt of a $C_1$ to $C_4$ fatty acid.

3. A lubricating composition according to claim 2, wherein said metal salt is calcium acetate.

4. A lubricating composition according to claim 1, wherein said petroleum resin has a softening point of about 207 to 218° F., a molecular weight of about 900 to 1200, and a Wijs iodine number of about 100 to 140.

5. A lubricating grease comprising a major amount of mineral lubricating oil, about 1 to 3 wt. percent of a substantially linear polypropylene of about 50,000 to 700,000 molecular weight, about 1 to 3 wt. percent of petroleum resin and about 7 to 12 wt. percent of calcium acetate, said petroleum resin being a substantially nonaromatic, unsaturated, hydrocarbon resin that has been prepared by catalytic polymerization of a steam-cracked petroleum hydrocarbon fraction, boiling in the range of from 20° to 170° C. and having a composition of 8 to 20 wt. percent diolefins, 19 to 49 wt. percent aromatics, 30 to 60 wt. percent olefins, and 1 to 5 wt. percent paraffins and naphthenes.

6. A lubricating grease according to claim 5, wherein said composition also contains 5 to 30 wt. percent, based on the weight of said calcium acetate, of a salt reaction product of phytic acid and 1-(2 amino ethyl-2-n-alkenyl-2-imidazoline) in amounts sufficient to form a neutral salt, wherein the alkenyl groups are heptadecenyl and heptadecadienyl groups.

7. A method of making a lubricant which comprises the steps of: heating a mixture of a major proportion of lubricating oil, about 0.5 to 5.0 wt. percent of a substantially linear polyproplene of about 20,000 to 1,000,000 molecular weight, and about 0.5 to 5.0 wt. percent of a petroleum resin to a sufficiently high temperature to melt the polypropylene and petroleum resin, and to disperse them in the lubricating oil; and cooling the resulting mixture without agitation to a temperature below the transition temperature of the polypropylene; the said petroleum resin being a substantially nonaromatic, unsaturated, hydrocarban resin that has been prepared by catalytic polymerization of a steam-cracked petroleum hydrocarbon fraction, boiling in the range of from 20° to 170° C. and having a composition of 8 to 20 wt. percent diolefins, 19 to 49 wt. percent aromatics, 30 to 60 wt. percent olefins, and 1 to 5 wt. percent paraffins and naphthenes.

References Cited by the Examiner

UNITED STATES PATENTS

| | | | |
|---|---|---|---|
| 2,109,772 | 3/38 | Frolich | 252—59 |
| 2,355,837 | 8/44 | Wilson | 252—357 |
| 2,976,243 | 3/61 | Morway et al. | 252—40.7 |
| 2,994,679 | 8/61 | Jones et al. | 252—59 |
| 3,033,787 | 5/62 | Norway et al. | 252—59 |

FOREIGN PATENTS 799,465  8/58  Great Britain.

OTHER REFERENCES

"Asphalts and Allied Substances," by Abraham, Fifth Edition, Vol. I, 1945, D. Van Nostrand Co., Inc., New York, page 511.

DANIEL E. WYMAN, *Primary Examiner.*